Oct. 28, 1969　　　W. S. STOKES　　　3,475,260
LAMINATED JOINT STRUCTURE DEFINING A FLUID LEAKAGE BARRIER
Filed May 18, 1965
FIG. 1.
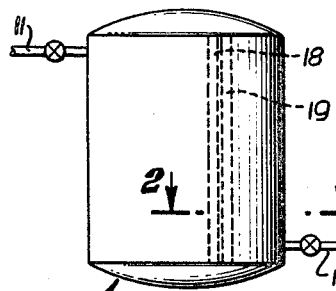
FIG. 2.
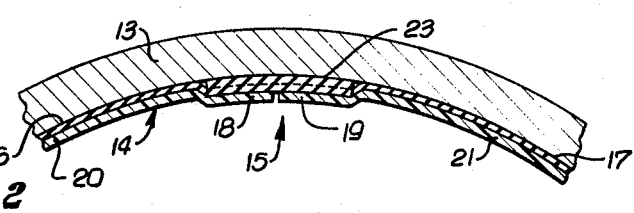
FIG. 3.
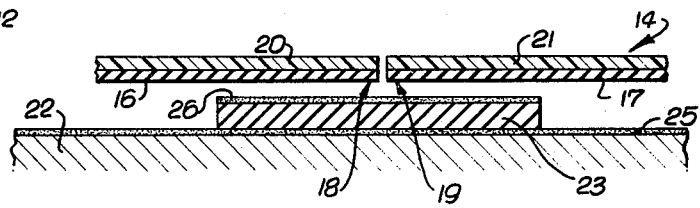
FIG. 4.
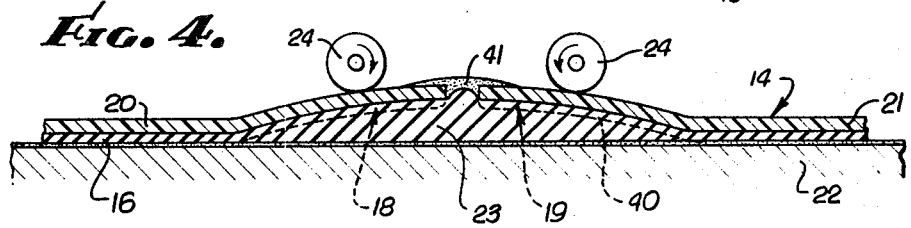
FIG. 5.
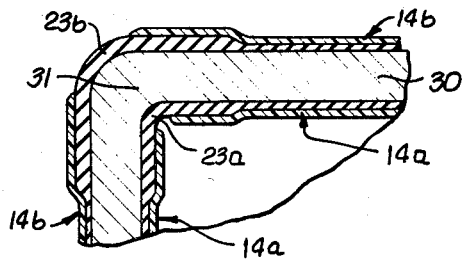
FIG. 6.
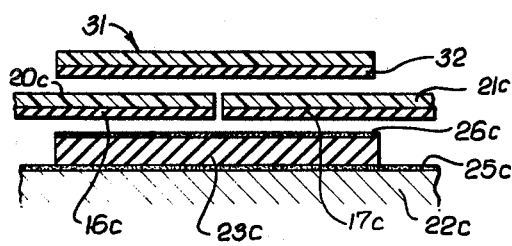
FIG. 8.
FIG. 7.
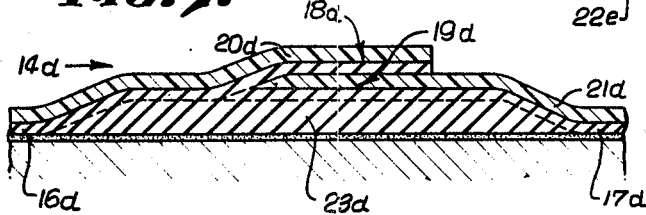
WILLIAM S. STOKES
INVENTOR.
BY *White & Haefliger*
ATTORNEYS

United States Patent Office 3,475,260
Patented Oct. 28, 1969

3,475,260
LAMINATED JOINT STRUCTURE DEFINING A
FLUID LEAKAGE BARRIER
William S. Stokes, 18655 Clark, Apt. 212,
Tarzana, Calif. 91356
Filed May 18, 1965, Ser. No. 456,701
Int. Cl. B32b 3/16
U.S. Cl. 161—38          7 Claims

ABSTRACT OF THE DISCLOSURE

A protective laminated joint which comprises first and second elastomeric sheets, one side of each sheet having attached thereto a backer sheet of fluid leakproof material, the terminal end portions of said first and second sheet being brought into mutual proximity, and a third elastomeric sheet extending in bridging relation to the terminal end portions of the first two sheets.

---

This invention relates generally to the utilization of linings to form leakproof joints, and more particularly concerns joints and methods of forming same involving application of elastomeric sheets having backer sheets attached thereto.

It is a major object of the invention to provide a lining joint, and method to form same, characterized in that the union is both strong and leakproof, and preserves the objective of providing a single, continuous, pin-hole free membrane over the surface being lined; further, the joint and method of forming same avoid leakage caused by improper adhesive application, leakage caused by lining wrinkles when making lap or butt joints, and avoid bonding difficulties caused by fillets or abrupt discontinuities.

Basically, the laminated joint structure is formed by bringing into mutual proximity the terminal end portions of first and second elastomeric sheets, as for example uncured butyl rubber, one side of each sheet having attached thereto a backer sheet of fluid leakproof material as for example polyvinylchloride, or other material as will be seen; in addition, a bond is effected between a third elastomeric sheet and the first and second sheets so that the third sheet extends in bridging relation to the terminal end portions of the first two sheets, to form therewith a continuous protective joint structure.

Additional aspects of the invention include the bonding of the first, second and third elastomeric sheets to a substrate; the bringing of the terminal end portions of the first and second sheets into overlapping relation; the application of pressure to the backer sheets thereby to transmit pressure from the first and seocnd sheets to the third sheet for deforming the latter and for promoting bonding, or cold impact welding; and the bonding of a fourth elastomeric sheet to the backer sheets and to extend in bridging relation thereto at the sides thereof opposite the first and second elastomeric sheets.

These and other objetcs and advantages of the invention, as well as the details of illustrative embodiments, will be more fully understood from the following detailed description of the drawings in which:

FIG. 1 is an elevational view of a tank or reservoir that may be lined in accordance with the invention;

FIG. 2 is an enlarged section taken on line 2—2 of FIG. 1;

FIGS. 3 and 4 are sections illustrating the method of forming the joints of FIG. 2;

FIG. 5 illustrates the application of the joint to a substrate corner;

FIG. 6 is a view like FIG. 3, but showing the application of a fourth elastomeric sheet and backer to the joint;

FIG. 7 is a sectional view of a modified joint, the first and seocnd elastomer sheets being overlapped; and FIG. 8 is a sectional view of still another modified joint.

Referring to FIG. 1, a tank which may be internally or externally lined in accordance with the invention is indicated at 10. It may for example be a potable water tank, and is illustrated to have inlet and outlet ducts 11 and 12.

In FIG. 2, the tank wall 13 forms what may be considered as a substrate for the lining 14, which includes a laminated joint structure 15 and defines a fluid leakage barrier for protecting the tank wall against fluid leakage and/or corrosion. Extending the description to FIGS. 3 and 4, the joint structure includes first and second elastomeric sheets 16 and 17 having respective terminal end portions 18 and 19 extending in mutual proximity as indicated. Backer sheets 20 and 21 of fluid leakproof material are attached to the outer sides of the elastomeric sheets, the attachment typically being effected by a bond developed under sufficient heat and pressure. In this regard, the sheets 16 and 17, and 20 and 21 may be considered as composite sheet lining, and may comprise one continuous sheet curved about or vertically down the sides of the tank wall so that the sheet terminals are brought into proximate relation.

The backer typically consists of a thermoplastic film such as polyvinylchloride, polypropylene, polyester, or polyethylene, polyvinylchloride being preferred, and a typical film thickness may be about 0.0135 inch, although such thickness may vary. Accordingly, the backer sheets comprise an impervious and flexible synthetic resin.

The elastomeric sheets 16 and 17 typically consist of uncured butyl rubber which is in a "tacky" pressure sensitive state. The latter is a synthetic rubber-like material, which is a copolymer of an olefin and a diolefin, for example a copolymer of a major proportion of isobutylene and a minor proportion of a diolefin copolymerized therewith, such as, butadiene 1,3 isoprene 2,3 dimethylbutadiene 1,3 pentadiene 1,3 as referred to in British Patent 523,248 and in Industrial and Engineering Chemistry, vol. 32, pages 1283 et seq. (1940). The thickness of the elastomer may for example be about 0.0115 inch although such thickness may also vary. Additionally, the bond interface 22 between the elastomer and backer sheets may contain glass fiber reinforcement, as for example a scrim or discrete particles of glass fiber.

A typical formula for the butyl rubber, given in my U.S. Patent 3,033,724 is as follows:

|  | Wt. parts |
|---|---|
| New butyl rubber | 15.8 |
| Reclaimed butyl rubber (Grade S 806 supplied by Xylos Rubber Co.) | 14.1 |
| Asphalt (melting point 170°–180° F.) (Petrolastic supplied by Standard Oil Company of California_ | 13.2 |
| Clay (aluminum silicate Super X) | 19.8 |
| Cumar P–10 | 4.5 |
| Polybutene 128 | 2.6 |
| Total | 70.0 |

The joint structure 15 also includes a third elastomeric sheet designated at 23 bonded to a side of each of the first and second elastomeric sheets 16 and 17 and extending in bridging relation to the terminal end portions 18 and 19 to form therewith a continuous protective joint structure. As before, the elastomeric sheet typically consists of uncured butyl rubber, and its thickness is substantially greater than that of sheets 16 and 17; thus, it may have a thickness of around .050 inch, although such thickness may vary.

FIG. 3 illustrates the joint elements with sheets 16 and 17 and their backers brought into mutual proximity, but before bonding to sheet 23. FIG. 4 on the other hand shows pressure applied, as by rollers 24 or by impact, to the backer sheets 20 and 21, for deforming the sheet 23 as indicated, materially aiding or promoting bonding of the sheets 16 and 17 to sheet 23. The unified interface is indicated by the broken line 40. Also, FIGS. 3 and 4 indicate the substrate 22 as being flat and as consisting for example of concrete. The substrate may also comprise metal such as steel.

The sequence of lining installation is described as follows: first, a thin layer of liquid adhesive is brushed, sprayed, or roller coated onto the substrate areas to be lined. One suitable adhesive is described in my U.S. Patent 3,033,724 as a priming coat consisting of a mixture of materials in hexane, the mix having the following composition in parts by weight:

| | Parts |
|---|---|
| New butyl rubber | 50 |
| Reclaimed butyl rubber | 150 |
| Polybutene 128 | 10 |
| Asphaltum (melting point 170° to 180° F.) | 200 |
| Cumar P-10 | 25 |

As there disclosed, 15 parts of this mixture is added to less than 85 parts by volume of hexane solvent to form the primer solution suitable as an adhesive. Another primer adhesive is known commercially as Corro-Ban Hydro-Lox No. 45, having remarkable compatibility and adhesive capabilities to polyvinyl chloride, butyl, steel, concrete and many other materials. It is supplied by Corro-Ban Products Co. of Burbank, Calif., and consists of a mixture of reclaimed butyl rubber, resins, and tackifiers dispersed in suitable solvent. The tackifiers for example consist of a copolymer of butyl and high molecular weight polybutene.

After the adhesive indicated at 25 in FIG. 3 is allowed to dry for a minimum of ½ to 1 hour, the elastomer sheet or tape 23 is installed. Thereafter a light coat of adhesive may be applied at 26 to the tape 23 to insure or promote a good tack, the adhesive having the same composition as that described above; another suitable adhesive activator is known commercially as Corro-Ban No. AC-60 adhesive solvent, and is supplied by Corro-Ban Products Co. of Burbank, Calif. The sheet lining 14 is then laid down as seen in the drawings, and the elastomer surfaces pressed together, direction of the lay depending upon the configuration and curvature of the substrate.

FIG. 5 illustrates a modified form of the invention wherein the substrate 30 forms a corner 31. A sheet or tape 23a corresponding to sheet 23 is applied to the interior corner, and sheet linings 14a corresponding to lining 14 are applied to the substrate and to sheet 23a to bring the elastomer sheets into overlapping contact for bonding. A similar configuration of tape 23b and overlapping sheet lining 14b appears at the exterior corner.

FIG. 6 has the same elements and configuration as FIG. 3; however, in addition a strip of sheet lining 31 is applied so that the fourth elastomer sheets 32 thereof is bonded to the backer sheets 20c and 21c to extend in bridging relation thereto and at the sides thereof opposite the first and second elastomeric sheets 16c and 17c. Sheets 16c, 17c, 20c and 21c correspond respectively to sheets 16, 17, 20 and 21 in FIG. 3. Also, the elastomer tape 23c corresponds to tape 23 in FIG. 3.

FIG. 7 differs from FIG. 4 primarily in that the elastomer sheet terminals 18d and 19d (corresponding to terminals 18 and 19 in FIG. 3) extend in overlapping relation. As a result, terminal 18d becomes bonded under pressure to backer 21d, and a highly protective joint is formed, with deformed elastomer tape 23d completely confined beneath the sheet lining 14d. As before, tape 23d merges adhesively with sheets 16d and 17d.

In FIG. 8 the backer sheets 20e and 21e are adhesively bonded to the substrate 25e, so that the butyl sheets 16e and 17e are outwardly exposed. Butyl tape 23e is bonded to sheets 16e and 17e as indicated to form the joint.

Referring back to FIG. 4, it also illustrates the provision of a sheet seam at 41 between terminal end portions 18 and 19, and consisting of a butyl base adhesive mastic. The latter may consist of an adhesive formulated as the adhesive described above but having a greater proportion of solids content, i.e. 60–65%, as for example is exemplified by the commercial product sold under the trademark Hydro-Lox #46 by Corro-Ban Products Company of Burbank, Calif.

1. A laminated joint structure defining a fluid leakage barrier, comprising first and second elastomeric sheets having terminal end portions extending in mutual proximity, a backer sheet of fluid leakproof material attached to and covering one side of each elastomeric sheet, and a third elastomeric sheet bonded to a side of each of said first and second elastomeric sheets and extending in bridging relation to said terminal end portions to form therewith a continuous protective joint structure, said elastomeric sheets being in tacky state in bonded condition, said backer consisting of an impervious and flexible synthetic polymer resin, said elastomer sheets each consisting of incompletely cured rubber, said third sheet having spaced apart pressure deformed edge portions of reduced thickness, the thicknesses of said first and second sheets remaining substantially uniform throughout their extents bridged by said third sheet.

2. The joint as defined in claim 1 including a rigid substrate onto which said first second and third sheets are bonded.

3. The joint as defined in claim 2 in which said substrate forms a corner onto which said third sheet is bonded.

4. The joint as defined in claim 1 including a substrate onto which said backer sheets are bonded.

5. The joint as defined in claim 1 in which said terminal portions extend in non-overlapping relation.

6. The joint as defined in claim 5 including a fourth elastomeric sheet bonded to said backer sheets and extending in bridging relation thereto at the sides thereof opposite said first and second elastomeric sheets.

7. The joint as defined in claim 1 in which said terminal portions extend in overlapping relation.

References Cited

UNITED STATES PATENTS

| 1,919,366 | 7/1933 | Haines | 161—38 |
| 2,550,520 | 4/1951 | Bennet | 161—145 X |
| 2,636,835 | 4/1953 | Boulware et al. | 161—167 X |
| 3,033,724 | 5/1962 | Stokes | 156—160 X |
| 3,342,656 | 4/1967 | Papageorges | 161—38 X |

FOREIGN PATENTS

| 252,989 | 2/1963 | Australia. |
| 1,340,393 | 1963 | France. |
| 922,746 | 4/1963 | Great Britain. |

ROBERT F. BURNETT, Primary Examiner

R. L. MAY, Assistant Examiner

U.S. Cl. X.R.

220—63; 138—170; 161—167; 156—71, 157, 300, 304